United States Patent [19]

Borglum

[11] Patent Number: 5,004,712
[45] Date of Patent: Apr. 2, 1991

[54] METHOD OF PRODUCING OPTICALLY TRANSPARENT YTTRIUM OXIDE

[75] Inventor: Brian P. Borglum, North Andover, Mass.

[73] Assignee: Raytheon Company, Lexington, Mass.

[21] Appl. No.: 276,975

[22] Filed: Nov. 25, 1988

[51] Int. Cl.$^5$ .................. C04B 35/50; B29D 11/00
[52] U.S. Cl. .................. 501/126; 501/152; 264/1.2; 264/65; 264/66; 423/263
[58] Field of Search .......... 501/126, 152; 423/263; 264/1.2, 65, 66

[56] References Cited

U.S. PATENT DOCUMENTS

| | | | |
|---|---|---|---|
| 3,545,987 | 12/1970 | Anderson | 501/152 |
| 3,764,643 | 10/1973 | Muta et al. | 501/152 |
| 3,873,657 | 3/1975 | Toda et al. | 501/152 |
| 4,098,612 | 7/1978 | Rhodes et al. | 501/152 |
| 4,115,134 | 9/1978 | Rhodes | 501/152 |
| 4,166,831 | 9/1979 | Rhodes et al. | 501/152 |
| 4,755,492 | 7/1988 | Greskovich et al. | 501/126 |
| 4,761,390 | 8/1988 | Hartnett et al. | 501/126 |

FOREIGN PATENT DOCUMENTS 0147744 12/1984 European Pat. Off. .
0277811 2/1988 European Pat. Off. .
2342910 3/1974 Fed. Rep. of Germany .
3702357 8/1987 Fed. Rep. of Germany .

Primary Examiner—William R. Dixon, Jr.
Assistant Examiner—Anthony J. Green
Attorney, Agent, or Firm—Denis G. Maloney; Richard M. Sharkansky

[57] ABSTRACT

A transparent yttrium oxide ceramic is made by densifying a yttrium oxide power without addition of dopants. The yttrium oxide powder is consolidated into a body of a predetermined shape and sintered to a density such that any remaining porosity is sealed from the surrounding atmosphere. The closed porosity body is then subjected to an elevated pressure and temperature to provide the body with substantially 100% of theoretical density while the body is disposed adjacent an oxygen supplying media. The oxygen supplying media is a ceramic media used to provide an oxygen partial pressure during the densification step ast the elevated pressure and temperature. After this step, a clear transparent body is provided without the need for any further high temperature processing such as a post densification anneal to restore oxygen stoichiometry to the body. The resulting body has substantial transparency over the wavelength range of 0.6 $\mu$m to 7 $\mu$m.

19 Claims, 4 Drawing Sheets

METHOD OF PRODUCING OPTICALLY TRANSPARENT YTTRIUM OXIDE

The Government has rights in this invention pursuant to Contract No. N60530-86-C-0139 awarded by the Department of the Navy.

BACKGROUND OF THE INVENTION

This invention relates generally to optical materials and more particularly to a method of forming bodies of optically transparent yttrium oxide.

As known in the art, there is a need for materials which are highly durable, and which have substantial optical transparency in both the visible and infrared optical bands. Applications for these materials include commercial systems such as metal vapor lamps and optical windows, as well as, military systems, such as airborne optical imaging systems. Optical imaging systems such as those found on an infrared heat seeking missile, generally have one or more optical elements such as windows or domes which are mounted on the external portion of the missile. These external elements are provided to isolate the remaining optics of the imaging system from the external environment through which the missile is flown. These external elements, therefore, must have a particularly high degree of resistance to environmental exposures and must have sufficient strength to protect the remaining components in the imaging system during operation of the imaging system in addition to having the aforementioned substantial transparency in the visible and/or infrared spectrums.

Several materials have been identified as potential candidates for these applications. Each of these materials generally has a high degree of strength and is theoretically capable of having a relatively high degree of infrared transparency, particularly within the wavelength range of approximately 2 microns to 5 microns. One material which is suitable in particular is yttrium oxide ($Y_2O_3$).

In addition to the aforementioned optical requirement for optical transparency in the wavelength range of approximately 2 microns to 5 microns, it is also desirable in certain applications that the optical element be transparent to wavelengths beyond 5 microns. For example, in missiles which are designed to travel at very high speeds for long periods of time, a dome mounted on the front portion of such a missile will reach elevated temperatures. A "hot" dome made of materials which do not transmit to long wavelengths beyond 5 microns, for example, may produce undesirable emissions resulting in increased system noise in the optical imaging system shielded by the dome.

Moreover, associated with such a "hot" dome is a requirement that the material of the dome withstand the thermal induced stresses created from the aerodynamic heating of the surface thereof.

Some techniques for producing $Y_2O_3$ domes involve sintering to substantially full density a $Y_2O_3$ body. In these techniques, sintering aids such as La are added up to 10% by weight to achieve the high density. The addition of these sintering aids has one drawback. The sintering aids in a material such as $Y_2O_3$ will reduce its thermal conductivity. Thus, reduced thermal conductivity will provide a concomitant reduction in thermal shock resistance of a dome. A hot dome, therefore, is susceptible to damage due to the reduction in thermal shock resistance.

A technique has been described for producing high quality $Y_2O_3$ which is suitable for the aforementioned applications. As described in U.S. Pat. No. 4,761,390 Hartnett et al., and assigned to the assignee of the present invention, relatively thick bodies of $Y_2O_3$ are produced by densifying a consolidated body of substantially pure $Y_2O_3$ by sintering at an elevated temperature until the body has a closed porosity density and then subjecting the closed porosity body to an elevated temperature and a simultaneous elevated isostatic pressure until final densification (approximately 99.99% of theoretical) has been achieved. The final densification step is followed by an annealing step to restore the body to clear transparency. The clear body has an optical transparency of greater than 73% over the wavelength range of 2-5 microns for samples having thickness up to 0.375 inches. The body also has a high thermal conductivity and relative small grain size and low coefficient of absorption. Thus, the material is a very desireable material for the above applications.

One drawback, as discussed in the patent, is that during the final densification step at the elevated temperature and elevated isostatic pressure, the yttria body is exposed to a reducing environment. Thus oxygen is lost from the body and the samples become non-stoichiometric. This oxygen defficiency results in a dark or black cast to the material. Therefore, in the above patent, a post-densification annealing step was performed to restore $O_2$ stoichiometry, thus removing the dark appearance after the final densification step.

However, the samples occasionally have a slight yellow tinge after annealling which degrades the visible transmittance properties. $Y_2O_3$ when subjected to a strongly oxidizing atmosphere gains oxygen interstitials. It is possible that these interstitials could cause this degradation in transmittance. Alternatively, it is possible that tungsten (W) contamination from the element of the vacuum furnace used during the sintering step could be present in the sample. This in turn would oxidize during annealling and form $WO_3$, which is yellow.

It would be desirable, therefore, to eliminate the post densification annealing step to prevent yellow tinge of the samples, while at the same time providing clear, transparent $Y_2O_3$ and otherwise maintain all of the advantageous optical and material properties described in the above-mentioned patent.

SUMMARY OF THE INVENTION

In accordance with the present invention, a method of forming a transparent yttrium oxide body comprising the steps of: providing a powder comprising of yttrium oxide and consolidating said powder into a body of a predetermined size and shape. The consolidated body is densified at an elevated temperature. Preferably, this temperature is in the range of 1700°-1900° C. more preferably in the range of 1800° C. to 1900° C. for period of time sufficient to densify the body to at least a closed porosity state. Typically, a closed porosity state for such a body is at least 91% and preferably 94% to 96% of the theoretical density of the yttrium oxide. The sintered, closed porosity body is then finally densified to substantially 100% of theoretical density by subjecting said body to an elevated pressure preferably in the range of 25,000-30,000 psi for a period of time of typically ½10 hours at an elevated temperature preferable in the range of 1700°-1900° C. During final densification, the sintered body is disposed adjacent a material which can supply an oxygen partial pressure to the body to maintain the stoichiometry of the body. With this particular arrangement, a clear transparent body of $Y_2O_3$ is provided after the final densification step without the need of further temperature or pressure processing steps such as annealling. Also, the yellow tinge occasionally provided with post annealled material is eliminated because the $Y_2O_3$ is no longer subjected to the relatively strong oxidizing environment typical of the post-densification anneal. Thus, the anneal induced yellow tinge is eliminated, and the cost of fabricating such a body is substantially reduced since an entire processing step is eliminated. A sample of the body having a thickness of 2 mm has an optical transparency of greater than about 75% over the wavelength range of about 2–6.5 microns and has substantial optical transparency of at least 60% over wavelengths to at least 7 microns. Further, if the yttrium oxide body is substantially 100% yttrium oxide (at least 99.9% yttrium oxide) as can be provided with this arrangement, then the body will have a high thermal conductivity and, hence, a high thermal shock resistance.

In accordance with a further aspect of the present invention, a method of forming a transparent yttrium oxide dome comprising the steps of providing a powder of yttrium oxide having an average particle size of between 1 and 2.0 μm and having a maximum agglomerated particle size of 10 μm, with the yttrium oxide powder being substantially 99.99% yttrium oxide. The yttrium oxide powder is then consolidated into a dome of predetermined size and shape by cold isostatic pressing the powder in a pressing mold including a teflon-coated aluminum mandrel and a latex rubber or urethane rubber membrane to define the shape of the dome. The powder is inserted into the mold and the assembly is placed in an isostatic press and compacted at a pressure in the range of 25,000–30,000 psi. The compacted dome is then fired for a predetermined period of time at a temperature in the range of 1350°–1450° C. until the dome is approximately 75% of theoretical maximum density. This step is used primarily to drive off the binder vehicle and dispersant. However, some densification of the compacted dome does occur during exposure to the elevated temperature environment. The consolidated, dense dome is then densified to approximately 95% of theoretical density or to provide the dome having a closed porosity state by sintering the body in a vacuum furnace at a temperature in the range of 1700°–1900° C. The sintered densified dome is subjected to an elevated isostatic gas pressure of 25,000–30,000 psi and elevated temperature in the range of 1700°–1900° C. for a sufficient period of time to provide the dome having a density which is substantially equal to 100% of the theoretical density for yttrium oxide. During this final densification step, to prevent oxygen from being lost from the body, the body is disposed in a container containing a suitable oxygen supplying media such as zirconium oxide (zirconia), yttrium oxide (yttria), or magnesium oxide (magnesia) or another suitable media. A suitable media is one which will not agglomerate during the densification step and can withstand the high pressure and temperature encountered during the densification step, while supplying an oxygen partial pressure. The presence of the oxygen supplying media will establish a suitable $O_2$ partial pressure about the $Y_2O_3$ body thereby maintaining the body's $O_2$ stoichiometry. With this particular arrangement, a clear, transparent yttrium oxide body is provided having a high thermal shock resistance, high optical transparency, typically in excess of 75% between 3.0 and 5.0 microns for a 2 millimeter thick sample, at least 60% transparency at wavelengths between 5 and 7 microns, and a relatively low coefficient of absorption of less than about 0.1 cm$^{-1}$ over the optical wavelength band of 3 to 5 microns without the need for a post densification anneal to restore $O_2$ stoichiometry.

BRIEF DESCRIPTION OF THE DRAWINGS

The foregoing features of this invention, as well as the invention itself, may be more fully understood from the following detailed description of the drawings in which.

DESCRIPTION OF THE PREFERRED ENVIRONMENTS

Figure 1:
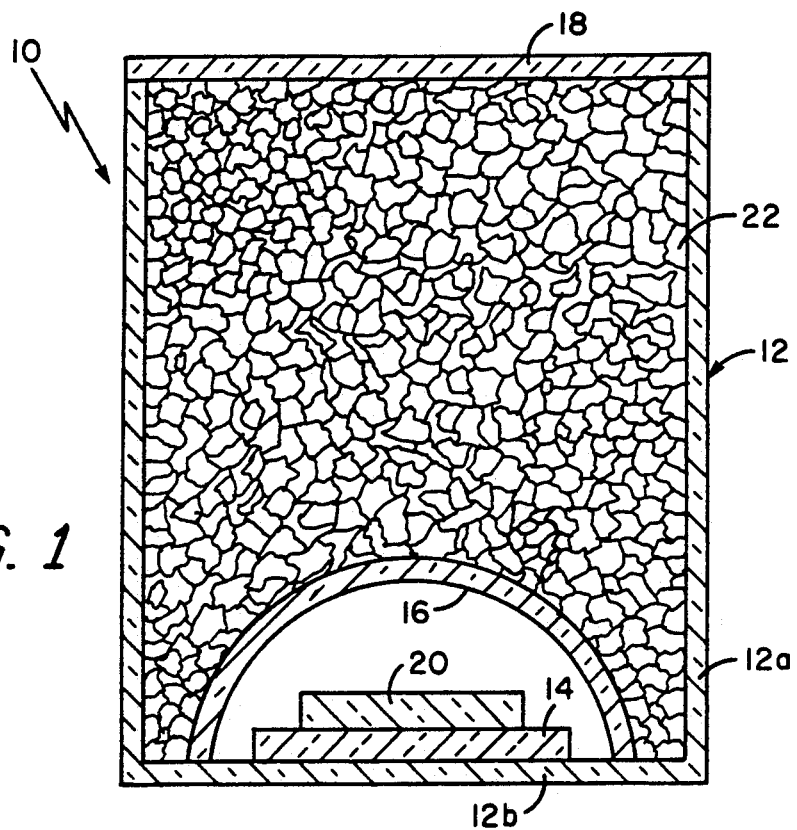
FIG. 1 is a cross-sectional view of a container to house a $Y_2O_3$ sample during final densification in accordance with the invention.

Fabrication of an optically transparent body comprising yttrium oxide will now be described. A powder comprising substantially 99.9% pure yttrium oxide preferably 99.99% $Y_2O_3$ having an average particle size of 1.0 μm–2.0 μm and having a maximum agglomerated particle size of 10.0 μm is provided. Yttrium oxide powder having the above-mentioned specifications is provided as follows:

Yttrium oxide powder is obtained from Union Moly Corp., White Plains, NY having a surface area in the range of 20 to 45 m$^2$/g and an average particle agglomerate size of 1 to 3 micrometers. This powder is typically 99.99% pure yttrium oxide. The powder is de-agglomerated, by ball milling in a polyethylene jug or a rubber lined milling jar, for example, for a period of 5 to 24 hours using ceramic grinding media such as zirconium oxide or yttrium oxide. After milling, the slurry is passed through a 400 mesh sieve to remove any large agglomerates and provide a de-agglomerated powder having an average particle size between 1 and 2.0 micrometers and a maximum agglomerated particle size of 10 micrometers. The powder may be further de-agglomerated by passing the slurry through an ultrasonic horn to spray dry the powder. An organic binder vehicle such as poly-vinylpyrolidone (typically PVP40/PVP10 in ratio of 4:1) up to 3% by weight is added to the de-agglomerated powder before spray drying. A small amount of a dispersant such as acetic acid is also added to the powder. The de-agglomerated powder having the organic binder and dispersant is then passed through a spray drier which dries the slurry at a rate of 1 liter/hr. The spray drying process step is generally used for fabricating a nonplanar shaped body such as a hemispherical dome. It is generally easier to have a free flowing powder to fill a nonplanar mold such as that used for the hemispherical dome to insure a uniform density of the powder in the mold.

Once the powder having the above specified particle size is provided, the powder is inserted into a pressing mold which will provide a rough body having substantially the desired shape. For example, the pressing mold for a hemispherical dome may include a teflon-coated aluminum mandrel to form the dome concave surface and a latex rubber or urethane rubber membrane to define the convex surface of the dome. The mold is filled with powder through a hole provided in the top portion of the mold and the hole is sealed and air is evacuated from the mold. The assembly is then placed in an isostatic press and compacted at an elevated pressure. Typically, an elevated pressure in the range of about 25,000-30,000 psi is used.

After the rough dome has been removed from the mold, it is placed within a furnace having an air atmosphere at a temperature in the range of 1350°-1450° C. to burnout the binder vehicle previously provided in the mold. The body is kept at the elevated temperature for a period of time of up to 90 minutes. Typically, the fired body has a density of approximately 75% of theoretical density and has shrunk in size about 10 to 12 percent.

Final densification of the resulting green dome body is then provided in a two step process. In the first step, the green dome is densified to a density of approximately 95% of theoretical density or at least to provide a body having a substantially closed porosity state, that is having a density greater than about 91%. In a preferred embodiment, this is accomplished by placing the body in a high vacuum tungsten furnace, which is disposed at a temperature in the range of 1700°-1900° C. to sinter the body. A tungsten furnace is used to reduce contamination of the $Y_2O_3$ body. In particular, a graphite type furnace may cause severe loss of oxygen from the $Y_2O_3$ body as well as incorporation of carbon into the body. This type of furnace is used to reduce the reduction of $Y_2O_3$ by chemical reaction with a reducing agent such as carbon present in graphite type furnaces which are conventionally used during the sintering process. The body is maintained at the elevated temperature typically for a time of 60 minutes or less. Preferably, the body is enclosed or shielded by a $Y_2O_3$ container. During this sintering step, there may be a slight tungsten film deposited over surface portions of the body particularly if the body was not protected. This film is generally physically removed prior to final densification. Other densification steps to achieve closed porosity may alternatively be used such as hot-pressing.

Figure 2:
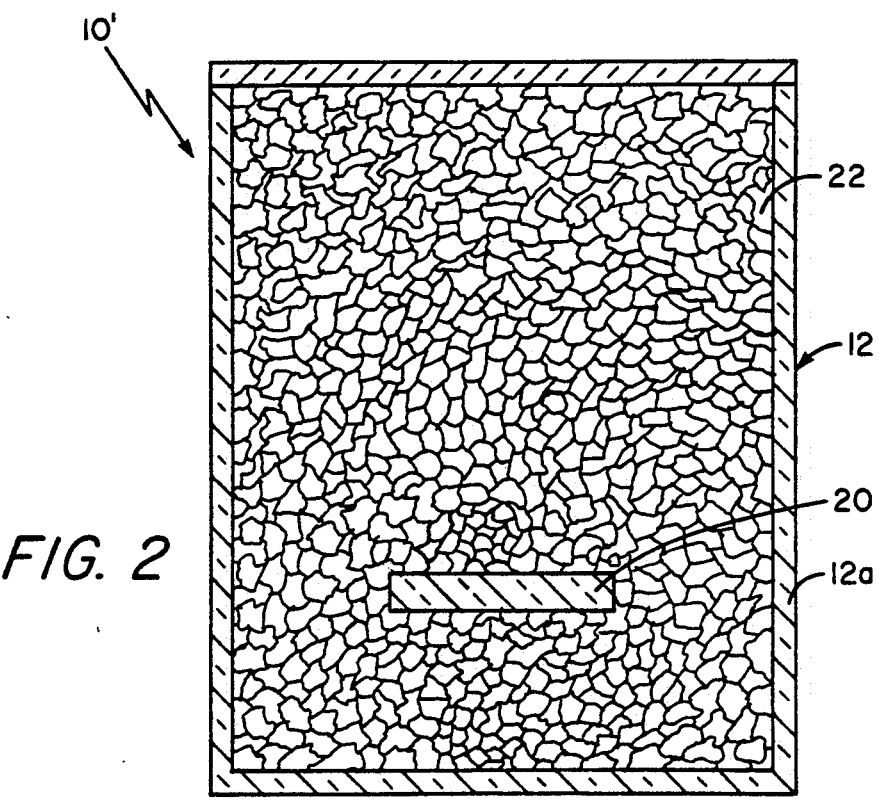
FIG. 2 is a cross-sectional view of an alternate container to house a $Y_2O_3$ sample during final densification.

The sintered body is then densified to substantially 100% of theoretical density by subjecting the body to an elevated pressure in the range of 1700°-1900° C. and an argon gas pressure of 25,000-30,000 psi for a period of time of 5 to 10 hours or until substantially 100% of theoretical density for the body is achieved. Relatively, short soaks at the maximum temperature are required, so long as the cycle time is about 5 to 10 hours, at a minimum. The body is disposed in a container as shown in FIGS. 1 or 2 when placed within the high temperature graphite furnace used for this final densification step. After this densification treatment, the dome is fully dense (99.9+% of theoretical density) and is clear, transparent.

Referring now to FIG. 1, a container 10 suitable to house a $Y_2O_3$ sample during the final densification step which occurs over an elevated pressure and elevated temperature is shown. The container 10 includes a crucible 12 here a cylinder having cylindrical sidewalls 12a sealed to a bottom plate 12b. The crucible is preferably comprised of either $Y_2O_3$ or $ZrO_2$ although other similar materials may be used. A setter plate 14 is disposed on the container 12 and is used to support sintered body 20 which is to be finally densified into a clear optically transparent body. Disposed over the setter plate 14 and shielding the body 20 is a dome 16 comprised here of $Y_2O_3$, or other suitable materials, such as magnesium oxide and zirconium oxide. Disposed in the remainder of the container 12 is an oxygen containing ceramic media which is capable of withstanding the temperatures and pressures encountered during final densification and which preferable will not agglomerate or densify itself so that it may be easily removed after the final densification step.

Here suitable material for the media 22 is a zirconia grog ($ZrO_2$). Zirconium oxide grog is characterized as a material with a large particle size. These coarse particles are typically on the order of 100 $\mu$m to 500 $\mu$m and larger. During final densification, some of the $O_2$ from the $ZrO_2$ will leave the grog, setting up an $O_2$ partial pressure around the sample 20 thus inhibiting $O_2$ reduction or returning $O_2$ to the $Y_2O_3$ body 20. Thus, with the $O_2$ partial pressure the $O_2$ stoichiometry of the $Y_2O_3$ body is maintained during the final densification step. This provides a body having a clear transparent state. Other suitable media may include material grogs of yttrium oxide or magnesium oxide for example.

Referring now to FIG. 2, an alternate container 10' to house the $Y_2O_3$ dome during final densification is shown. Container 10' includes the crucible 12 as described above. Here, however, the crucible 12 is filled with the media 22 as also described above, and the dome is placed within the media without any $Y_2O_3$ bodies to shield the dome sample 20 from the $O_2$ containing media.

After final densification with either type of container shown in FIGS. 1 and 2, the dome is provided to a substantially clear, transparent state and may be ground and polished using conventional techniques to provide a predetermined surface finish and tolerance. For example, the body may be ground using fixed abrasive diamond tooling, and a predetermined surface finish may be provided using alumina powder and high speed lapping media.

Thus, a clear, transparent dome is provided without the need for any post densification annealling cycles.

Figure 3A:
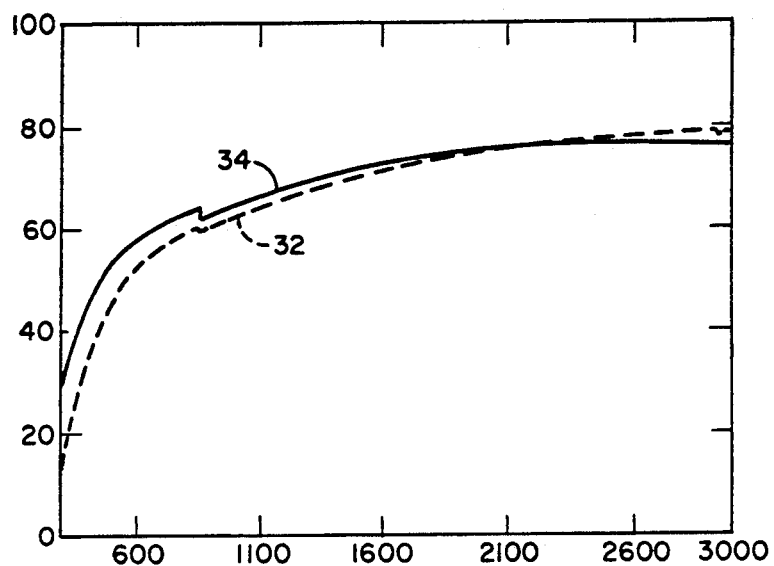
FIGS. 3A, 3B are plots of percent in-line optical transmittance as a function of wavelength for a sample of yttrium oxide fabricated in accordance with the present invention, as described in FIG. 1 compared to that described in the prior art over the visible spectrum (FIG. 3A) and infrared spectrum (FIG. 3B)
Figure 3B:
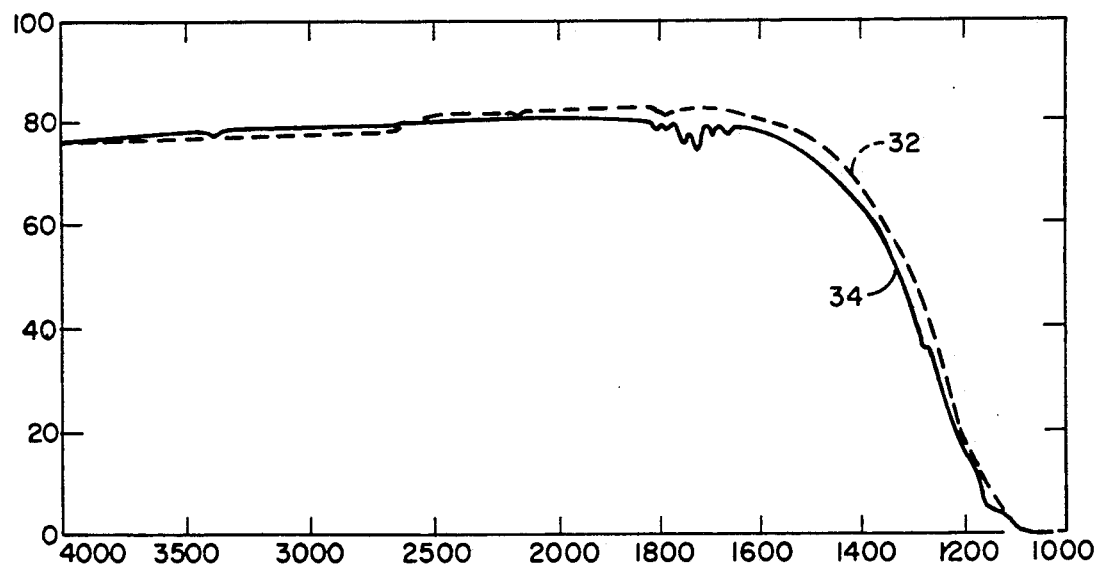

Referring now to FIGS. 3A and 3B, plots of in-line percent transmittance, uncorrected for surface reflection losses verses wavelength for samples having a thickness of 2 mm are shown. Set forth in the Table are the process parameters for the two samples shown in FIGS. 3A and 3B. Curve 32 is for a sample having a thickness of 2 mm fabricated in accordance with the teachings of U.S. Pat. No. 4,761,390 using a post densification anneal at 1450° C. in air for approximately 5 hours. Curve 34 is for a sample also having a thickness of 2 mm fabricated in accordance with the teachings of the present invention, using an oxygen supplying media to maintain $O_2$ stoichiometry during the final densification of the body.

Over the visible and short wavelength IR spectrums of the present invention actually had a slightly improved optical transparency. Over the IR spectrum from about 2.0 microns to 4.0 microns, the transparencies were substantially equal. Above 4.0 microns, the transparency of the annealed sample is slightly better than that of the non-annealed sample. Both slight differences are relatively unimportant and in general, this data indicates that material provided by the present invention is as good as that provided by the prior technique.

Figure 4A:
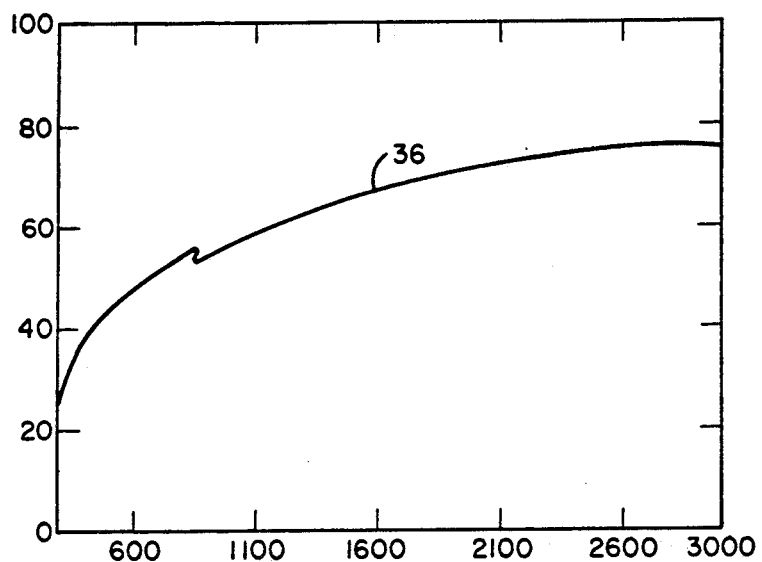
FIG. 4A, 4B are plots of percent in-line optical transmittance as a function of wavelength for a sample of yttrium oxide fabricated in accordance with the invention as described in conjunction with FIG. 2, over the visible spectrum (FIG. 4A) and infrared spectrum (FIG. 4B)
Figure 4B:
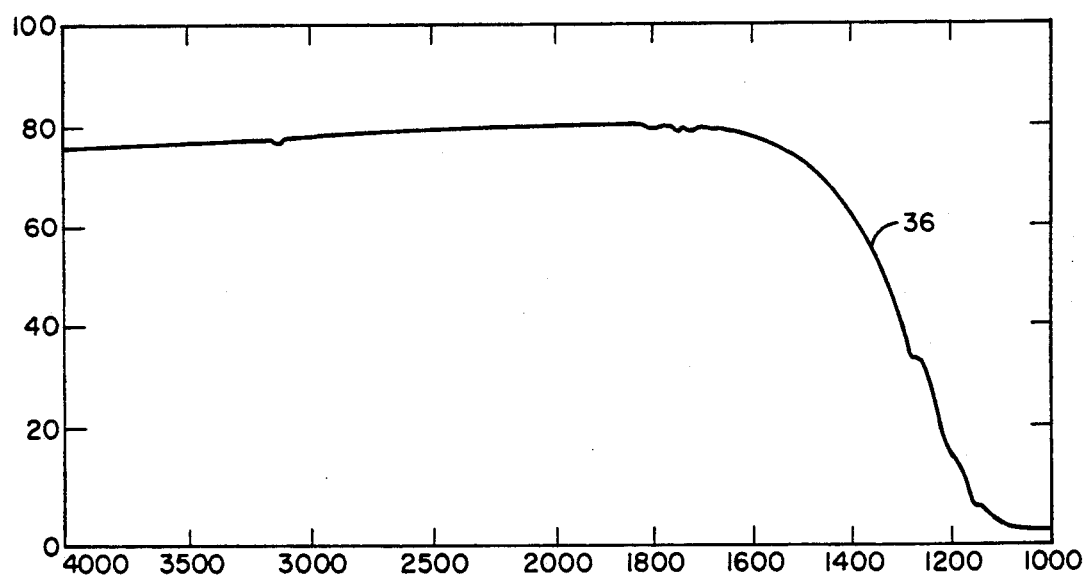

Referring now to FIGS. 4A, 4B, plots of in-line percent transmittance, uncorrected for surface reflection losses, versus wavelength for a sample having a thickness of 2 mm and fabricated using the container of FIG. 2 are shown. Curve 36 shows that over the visible, and infrared spectrum, direct contact of the sintered body with the $O_2$ supplying media also provides clear transparent material The transparency measured over 0.6 $\mu$m to 7.0 $\mu$m wavelength is substantially equivalent to that shown in FIGS. 3A, 3B for either curve 32 or 34. Thus, either technique as described in conjunction with FIGS. 1 or 2 may be used to provide clear transparent material equivalent to that shown in the abovementioned patent without the need for a post-anneal step.

accordance with the present invention has an average grain size of about 150 microns.

Finally, the darkness generally associated with the body after final densification is eliminated by using a container during such final densification step which contains a media which provides an $O_2$ partial pressure to the body during final densification.

The calculated coefficient of absorption for material fabricated in accordance with the present invention is expected to be less than about 0.1 cm$^{-1}$ as in the above U.S. patent.

Thus, a simplified process which provides a $Y_2O_3$ body having all of the optical and material advantages mentioned in the U.S. patent, but at a reduced processing cost is provided.

Having described preferred embodiments in the invention, it will now become apparent to one of the skill in the art that other embodiments incorporating their concepts may be used. It is felt, therefore, that these embodiments should not be limited to disclosed embodiments, but rather should be limited only to by the spirit and scope of the appended claims.

What is claimed is:

1. A method of densifying a body having a substantially closed porosity density, consisting essentially of

TABLE

| Curve | Sample Thickness (mm) | % T @ 4.0 $\mu$m | Sinter[1, 5] | | Final Densification[1, 2, 4] | | Anneal | |
|---|---|---|---|---|---|---|---|---|
| | | | Temp. (°C.) | Time (mins.) | Temp. (°C.) | Time (hrs.) | Temp. (°C.) | Time (hrs.) |
| 32 | 2.0 | 80 | 1890 | 30 | 1890 | 3 | 1450 | 5 |
| 34 | 2.0 | 79 | 1900 | 90 | 1900 | 4 | | |
| 36 | 2.0 | 79.2 | 1900 | 90 | 1900 | 4[3] | | |

[1]Times are for the dwell time at the max. temperature.
[2]$O_2$ containing media was a $ZrO_2$ grog having a coarse grain, particle size of about 100–500 $\mu$m.
[3]$ZrO_2$ grog was in direct contact with the sample.
[4]Pressure was 29,000 psi.
[5]Final sinter density was about 95%.

Figure 5:
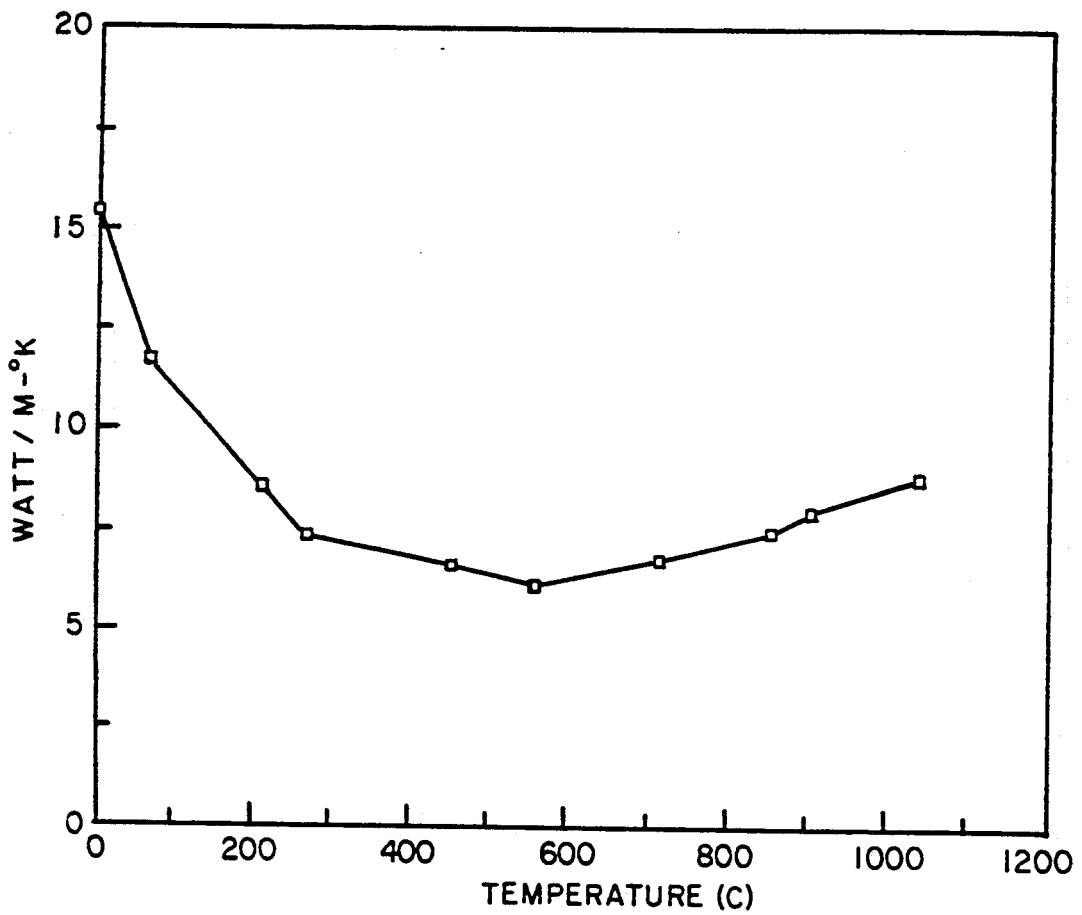
FIG. 5 is a graph of thermal conductivity vs. temperature typical of the $Y_2O_3$ fabricated in accordance with the present techniques.

Since the yttrium oxide bodies fabricated in accordance with the present invention are substantially pure, that is comprise substantially 99.9% yttrium oxide, the body comprised of yttrium oxide material has a high thermal conductivity and concomitant therewith, the yttrium oxide body will have a high thermal shock resistance, compared to yttrium oxide bodies having dopant additives. The thermal conductivity characteristics, typical of such samples of substantially pure $Y_2O_3$ are the same as mentioned in the above-mentioned U.S. patent and are shown in FIG. 5.

Since the body is sintered only to achieve a closed porosity state (between about 91% to 96% of theoretical density) and accordingly, relatively short periods of time and lower temperatures are used than those required by previous methods which attempted to produce fully dense sintered bodies, the requirement for using dopant additives to provide fully sintered bodies is eliminated. The use of a W (tungsten) heating element furnace during the sintering cycle is seen as aiding the ability to sinter the material to the closed porosity state without any dopant additives. Furthermore, the W element aids in preventing contamination to the $Y_2O_3$ by the carbon reducing generally associated with graphite heating elements. Moreover, the yttrium oxide bodies fabricated in accordance with the present techniques are densified at significantly lower temperatures and shorter duration exposure to environments which are believed to increase degradation to the material and increase grain growth. Generally, material fabricated in yttrium oxide, to substantially full density, comprising the step of:
heating said closed porosity body to an elevated temperature at an elevated isostatic pressure until said body is substantially fully dense while said body is disposed adjacent an oxygen supplying ceramic media which provides an oxygen partial pressure to maintain $O_2$ stoichiometry in said body.

2. The method of claim 1 wherein said media is selected from the group consisting of zirconium oxide, magnesium oxide, and yttrium oxide.

3. The method of claim 2 wherein said media is zirconium oxide.

4. A method of fabricating a body of yttrium oxide, comprising the steps of:
providing a starting powder of 99.99% yttrium oxide;
compacting said yttrium oxide powder to form a body having a selected size and shape;
sintering said compacted body at an elevated temperature to provide a body having a closed porosity state; and
heating said closed porosity body to an elevated temperature at an elevated pressure for a period of time until said body achieves a density of substantially 100% of theoretical density while said body is disposed adjacent a ceramic media which provides an oxygen partial pressure to restore or inhibit oxygen reduction from the body.

5. The method of claim 4 wherein said media is selected from the group consisting of zirconium oxide, yttrium oxide, magnesium oxide.

6. The method of claim 5 wherein said media is zirconium oxide.

7. The method of claim 4 wherein said body is disposed in an enclosed container consisting essentially of a material selected from the group consisting of yttrium oxide, zirconium oxide, magnesium oxide and the media consists essentially of a material selected from the group consisting of zirconium oxide, yttrium oxide, or magnesium oxide.

8. The method of claim 7 wherein said body is disposed within the media and the media is a grog of the selected material.

9. The method of claim 7 wherein said body is at least partially shielded from the media by a shield selected from the group consisting of zirconium oxide, yttrium oxide, or magnesium oxide and said media is a grog of the selected material.

10. The method as recited in claim 9 wherein the sintering step occurs in a high vacuum tungsten heating element furnace.

11. The method as recited in claim 10 wherein said densifying step occurs at a temperature in the range of 1700° C. to 1900° C. at an elevated pressure in the range of 25,000 psi to 30,000 psi.

12. The method as recited in claim 11 wherein temperature of the sintering step is in the range of 1700° C. to 1900° C.

13. The method as recited in claim 12 wherein temperature of the sintering step is in the range of 1800° C. to 1900° C.

14. A method of fabricating a body of at least 99.99% yttrium oxide, comprising the steps of:
providing a yttrium oxide powder of at least 99.99% yttrium oxide having an average particle size between 1 and 2.0 micrometers, and having a maximum agglomerated particle size of 10 micrometers;
consolidating said powder to provide a body having a density of about 75% of theoretical density;
densifying the 75% dense body to a closed porosity state in a vacuum at a temperature in the range of 1700°–1900° C. for a period of time at the maximum temperature of typically 30 minutes or less; and
densifying the closed porosity, sintered body to substantially 100% of the theoretical density by subjecting the body to a temperature in the range of 1700°–1900° C. at a pressure in the range of 25,000–30,000 psi while said sintered body is disposed in a container containing zirconium oxide which acts as a source of oxygen during the densification step to maintain the stoichiometry of the yttrium oxide.

15. The method as recited in claim 14 wherein after the densifying step occurs, the body is removed from the container, and subjected to the step of grinding and polishing the surface of the body.

16. The method of claim 15 wherein said densifying step occurs at a temperature in the range of about 1700° C. to 1900° C.

17. A method of fabricating a non-planar body comprised of at least 99.9% yttrium oxide having a transmittance of at least 75% over a wavelength range of 2.5 to 6.5 microns for a sample having a thickness of about 0.08 inches, comprising the steps of:
providing a yttrium oxide powder of at least 99.9% yttrium oxide having an average particle size of 1 to 2.0 micrometers and having a maximum agglomerated particle size of 10 microns;
adding a binder vehicle and dispersant to the powder and spray drying the powder to provide a free flowing powder;
directing the free flowing powder into a non-planar mold and subjecting the powder in the non-planar mold to an isostatic pressure in the range of 25,000–30,000 psi;
removing the binder vehicle by subjecting the powder to a temperature in the range of 1350°–1450° C. for a predetermined period of time in an atmosphere of air;
densifying the powder to a closed porosity state in a vacuum at a temperature in the range of 1700°–1900° C. a period of time at the maximum temperature of typically 30 minutes or less; and
densifying the closed porosity sintered body to substantially 100% of theoretical density by subjecting the body to a temperature in the range of 1700°–1900° C. at a pressure in the range of 25,000–30,000 psi until the body is substantially 100% of theoretical density while said body is disposed adjacent zirconium oxide which provides an oxygen partial pressure about said body during the densifying step.

18. The method of claim 17 wherein said non-planar body is a hemispherical dome.

19. The method of claim 18 wherein after the densifying step, the dome is subjected to the step of grinding and polishing the dome surface.

* * * * *